3,231,480
CORROSION PROTECTION
Lawrence V. Collings, Park Forest, and Paul Shapiro, Chicago, Ill., assignors, by mesne assignments, to Sinclair Research, Inc., New York, N.Y., a corporation of Delaware
No Drawing. Filed May 25, 1961, Ser. No. 112,496
17 Claims. (Cl. 204—147)

This application is a continuation-in-part of copending application Serial No. 829,488, filed July 27, 1959, now abandoned.

This invention is concerned with the protection of ferrous metal objects which are in contact with corrosive aqueous liquids by using zinc and arsenic. It has been found that the addition of small quantities of zinc cation producers and soluble arsenic to a corrosive aqueous medium in contact with a ferrous object serves effectively to reduce corrosion due to other materials, mainly oxygen and electrolytes, dissolved in the solution. Compositions made according to this invention are particularly useful as a ballast in ships; they have the definite advantage that they are far less corrosive to the ballast tanks than the seawater, harbor water or other salty water ordinarily used for this purpose. Furthermore, the use of this invention allows significant savings in the expense of maintaining cathodic protection of the ferrous metal objects.

Corrosion problems are particularly acute where large numbers, fabricated from ferrous metals, are in constant contact with an aqueous medium containing dissolved oxygen, or in contact with oxygen and moisture either intermittently or simultaneously. In oil tanker operations it is conventional practice in seamanship to take seawater, harbor water, or other electrolyte-containing water, aboard when the ship is carrying less than its customary cargo. These waters are very corrosive to the ferrous-metal tanks aboard the ship in which it is carried. This invention provides a ballast composition comprising water containing electrolytes to which zinc and arsenic have been added. The water may be full strength seawater or the diluted seawater found in harbors or other impure water. The invention also provides a method by which the corrosion of any ferrous vessel used for storing water of any type may be mitigated by adding these materials to stored water which does not have to be pure, such as the water used for fire-extinguishing, cooling, etc.

Conventional methods of protecting tanks, pipes and other steel and iron surfaces include coating the metal with various compositions to prevent access of the corrosive medium and also the use of cathodic protection systems. Coatings, however, wear away and must be frequently renewed—a tedious and expensive job. Furthermore, pits, scratches and other holidays in the coating frequently expose the surface to the aqueous corrosive medium, leading to rust spots. Cathodic protection systems are expensive to install and the wearing away of the sacrificial anodes used or the electrical energy supplied in rectified current protection systems are usually heavy operating expenses.

This invention provides a means wereby the cost of maintaining a protective coating or the cathodic protection may be drastically reduced or corrosion of the member may be retarded without cathodic protection. The composition of this invention is a substantially non-corrosive aqueous solution containing dissolved electrolytes, as an example in the proportions found in seawater, and also containing zinc cations and soluble arsensic in amounts sufficient to retard corrosion of ferrous metal objects with which it is in contact. In this composition, when employed in the absence of cathodic protection, the zinc and arsenic are generally incorporated in an amount sufficient to inhibit corrosion, for instance, to provide at least about 50 p.p.m. zinc ion and soluble arsenic, preferably at least about 150 p.p.m. of each. The maximum amount of zinc and arsenic need not be greater than about 1000 p.p.m. but this is primarily an economic consideration. In terms of the zinc and arsenic compounds which can be employed the amounts can be at least about 100 p.p.m., preferably at least about 250 p.p.m. of each compound. The maximum amount of these compounds in the corrosive medium is determined by cost factors, but rarely, if ever, exceeds 1500 p.p.m. of each type of additive.

For the prevention of corrosion of a cathodically protected ferrous metal member, considerably less of the zinc and arsenic need be incorporated in order to give protection at a substantially reduced electric current. In terms of the active zinc and arsenic employed, enough zinc cation producer, e.g. zinc salt, is used to provide at least about 5 p.p.m., preferably at least about 10 p.p.m. zinc, along with enough arsenic containing material to provide at least about 0.5 p.p.m., preferably at least about 2 p.p.m. of arsenic in solution. Usually the corrosive liquid is provided with at least about 10 p.p.m. of a zinc salt and preferably at least about 25 p.p.m. of the zinc salt, along with at least about 1 p.p.m., preferably at least about 5 p.p.m. of arsenic-containing material or compound. When a zinc anode is used to cathodically protect a ferrous metal member, it supplies more than enough zinc ions to the solution to meet the requirements of this invention and therefore arsenic only need be incorporated in the amounts stated in order to give protection at a substantially reduced electric current, and consequent reduction in anode wear. Usually an amount of arsenic-containing material is used sufficient to supply in solution about 2–40 p.p.m. and preferably about 5–20 p.p.m. of arsenic. The arsenic is most often present in an anion in either the cathodic or the non-cathodic protection system.

The material used to supply zinc cations, when a zinc anode is not employed, is generally a water-soluble zinc salt and economy dictates the use of an inorganic material. Zinc acetate, borate, nitrate, sulfate and most halides and halates are sufficiently soluble in water to be used in this invention. Zinc chloride and zinc sulfate are preferred. Useful arsenic compounds which are soluble enough in water to be used in this invention include, for instance, the sodium, potassium, ammonium and hydrogen arsenates and arsenites as well as some organic arsenic esters. Hydrogen arsenate (arsenic acid) and hydrogen arsenite (arsenous acid) are preferred. These materials may be added to the corrosive medium in the dry state or as a solution or suspension in water. An additive may be prepared, for example, by dissolving arsenous trioxide in dilute NaOH. This additive is a solution of sodium arsenite and sodium acid arsenite with perhaps some free arsenic acid or sodium hydroxide.

Seawater contains a number of non-aqueous saline materials, the major portion of which is sodium chloride. A kilogram of seawater contains approximately the following milligram atoms of dissolved inorganic materials:

| | |
|---|---:|
| Chlorine | 535.0 |
| Sodium | 454 |
| Magnesium | 52.29 |
| Sulfate | 27.55 |
| Calcium | 10.19 |
| Potassium | 9.6 |
| Carbon dioxide | 2.25 |
| Bromine | 0.81 |
| Strontium | 0.15 |
| Aluminum | 0.07 |
| Fluorine | 0.043 |
| Silicon | 0.04 |
| Boron | 0.037 |
| Lithium | 0.015 |
| Nitrate | 0.014 |
| Iron | 0.0036 |
| Manganese | 0.003 |
| Phosphorus | 0.002 |
| Copper | 0.002 |
| Barium | 0.0015 |
| Iodine | 0.00035 |
| Silver | 0.0002 |
| Nitrite | 0.0001 |
| Arsenic | 0.00004 |
| Zinc | 0.00003 |

That is seawater contains about 240 parts chlorine to about 200 parts sodium to about 23 parts magnesium to about 12 parts sulfate to about 4½ parts calcium to about 4 parts potassium to about 1 part carbon dioxide. Harbor water contains most of these constituents in about these same proportions but sizeable variations may occur in the quantity of some electrolytes present, e.g. sulfate, due to industrial wastes, etc.

Cathodic protection systems involve the use of a rectified electric current or sacrificial anodes to take the brunt of the oxidative effects of the corrosive medium. Dissolved oxygen and water react with each other according to the following equation when a supply of electrons is available:

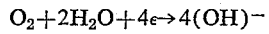

$$O_2 + 2H_2O + 4e \rightarrow 4(OH)^-$$

When a ferrous metal is present, the electrons are secured from the iron member, causing conversion of iron atoms to iron ions with consequent passage of these ions into solution and the familiar rusting, corrosion phenomenon. Also, the removal of dissolved oxygen from the water allows further oxygen to dissolve in the corrosive medium, continuing the cycle of reactions. In a cathodic protection system, however, excess electrons are conducted to the ferrous member to supply the electrons needed to convert the free oxygen so that the iron itself is spared. The excess electrons conducted to the ferrous member give this member a negative charge, making it a cathode and causing migration to the ferrous member of positive ions in the aqueous medium containing an electrolyte. Rectified current systems may employ any type of electric conductor for an anode, with electricity being supplied from an external direct current source.

Sacrificial anode systems supply a negative charge to the member to be protected by deterioration of the anode. The anode is an elemental metal more electropositive than iron, that is, one which has a greater tendency to dissolve in the aqueous corrosive medium as positively charged ions, leaving electrons on the remaining metal of the anode and surrounding the free metal with an environment rich in the positively charged dissolved ions. By attracting negative ions through the aqueous medium the positively charged region around the magnesium, zinc, etc., rod used is effectively an anode. The excess electrons left on the rod itself are conducted by an electrical lead frequently outside or insulated from the aqueous medium, to the ferrous member which is to be protected.

For protection of iron or steel against corrosion it has been established that the corrodible metal should be maintained at a potential more negative than −0.77 volt with respect to a calomel electrode. Voltages more negative than about −0.9 could be used, but the expense has not been found to be justified. Since a calomel electrode, using a 1.0 N KCl salt bridge has a potential of −0.2805 with respect to a hydrogen electrode, the ferrous metal requires a standard minimum potential of about −0.49 volt. The effectiveness of any system for cathodic protection can be determined by measuring the amount of current density in the circuit required to maintain the potential between the cathode and the calomel electrode of a standard reference cell. The current density, of course, is a measure of the energy put into the system, whether the mechanical energy of the generator or the chemical energy of the sacrificial anode. It can be regulated by adjusting the speed of the generator or the number and size of anodes. The expense of generating power is necessarily a costly one and, by increasing shipping charges, is reflected in the cost of products so shipped, e.g. petroleum products. The use of sacrificial metal anodes is even costlier, although mor convenient. In some circumstances it is more feasible to let the ferrous object rust and replace it rather than try to use cathodic methods of protecting it.

This invention provides a means whereby the cost of maintaining a charge on the ballast tank sufficient to prevent corrosion, may be drastically reduced, or corrosion of the member may be retarded without cathodic protection. The process of this invention provides the corrosive aqueous medium with zinc cations and arsenic which enable the current requirement of the ordinary cathodic protection system to be drastically reduced, or which protect the corrodible metal without current. The current density applied in a cathodic protection system may frequently run as high as about 50 milliamperes per square foot. In the process of this invention current densities as low as about 0.7 ma./ft.$^2$ or lower are effectively used. Thus less current needs to be applied from an external source or the sacrificial anode will last longer. The process is effective in reducing current requirements even when a very small quantity of the soluble zinc and the soluble arsenic are used.

In a cathodic protection system the zinc salt and arsenic compound are preferably provided in a ratio of about 1–5 parts zinc salt/part arsenic compound and in a total quantity of about 15–75 p.p.m. of the aqueous corrosive medium. In terms of the active materials, the proportion generally is about 1–5 parts zinc/part arsenic and in a total quantity to provide about 7–40 p.p.m. of the aqueous corrosive medium. Since when a zinc anode is employed no zinc salt or other source of zinc ions need be provided the arsenic is preferably provided in concentrations of about 2–20 p.p.m. Where no current is to be applied, approximately equal weights of soluble zinc salt and soluble arsenic compound may be used with advantage, and the total amount is 200 to 3000 p.p.m., preferably about 750 to 1250 p.p.m., or about 150 to 2000 p.p.m., preferably about 350 to 1000 p.p.m. based on the weight of active zinc and soluble arsenic added.

EXAMPLES

The following specific embodiments of the composition and process of this invention are not to be considered as limiting the invention.

The ASTM Standard Specification for Synthetic Sea

Water (ASTM D-665-54) provides a solution containing inorganic salts in proportions representative of ocean water. The process by which this water is made can be found on page 295 of "ASTM Standards on Petroleum Products and Lubricants," November 1957. This synthetic sea water has a pH of 8.2 and contains:

| Compound— | Gms./l. |
|---|---|
| NaCl | 24.54 |
| $MgCl_2 \cdot 6H_2O$ | 11.10 |
| $Na_2SO_4$ | 4.09 |
| $CaCl_2$ | 1.16 |
| KCl | 0.69 |
| $NaHCO_3$ | 0.20 |
| KBr | 0.10 |
| $H_3BO_3$ | 0.03 |
| $SrCl_2 \cdot 6H_2O$ | 0.04 |
| NaF | 0.003 |

A series of tests were run upon this corrosive aqueous mixture alone and upon the mixture inhibited with varying amounts of soluble zinc salts and soluble arsenic compounds. In the tests reported below, Solution A was the synthetic seawater described above, which contained the ratio of dissolved inorganic materials described earlier. The compositions used in the other tests were further samples of this seawater to which agents were added as follows:

| Solution | Concentration (p.p.m.) | Agent | Added as— |
|---|---|---|---|
| B | 32.5 | Zinc | $ZnCl_2$. |
| C | 13.3 | Zinc | $ZnSO_4$. |
|   | 5.3 | Arsenic | $H_3AsO_4 \cdot \frac{1}{2}H_2O$. |
| D | 13.3 | Zinc | $ZnSO_4$. |
|   | 10.6 | Arsenic | $H_3AsO_4 \cdot \frac{1}{2}H_2O$. |
| E | 10 | ---do--- | $NaAsO_2$. |
| F | 5 | ---do--- | $NaHAsO_4 \cdot 7H_2O$. |
| G | 10 | ---do--- | $NaHAsO_4 \cdot 7H_2O$. |
| H | 20 | ---do--- | $NaHAsO_4 \cdot 7H_2O$. |
| J | 40 | ---do--- | $NaHAsO_4 \cdot 7H_2O$. |
| K | 2.5 | ---do--- | $NaAsO_2$. |
| L | 10 | ---do--- | $NaAsO_2$. |
| M | 20 | ---do--- | $NaAsO_2$. |
| N | 1,000 | $ZnCl_2$ |   |
| P | 1,000 | $H_3AsO_4$ |   |
| Q | 250 | $ZnCl_2$ |   |
|   | 250 | $H_3AsO_4$ |   |
| R | 500 | $ZnCl_2$ |   |
|   | 500 | $H_3AsO_4$ |   |

In series I and II of the tests, glass beakers open to the air were ¾ filled with each of solutions A to E. A magnesium rod 6¼" x ½" was immersed in the solution in each bottle 4.5 inches from the cathode. The cathodes consisted of steel coupons with an exposed surface area of 6½ square inches. The current supplied by each anode was the amount that would maintain a minimum protective potential on the steel of −0.80 to −0.85 volt relative to a calomel half cell which was immersed in the electrolyte when the reading was desired. The current provided to each solution was controlled by 15,000 ohm variable resistors. After the first day of operation the amount of current required to keep the minimum potential was found to decrease, and the decrease was far greater with compositions of this invention. Current measurements were taken every few days and the results are reported in Table I.

In series III, 4 liter beakers were filled with 3.5 liters each of solutions A and F to M. A zinc rod, 6¼" x ½", machined from high purity (99.999%) zinc anode metal, was immersed in the solution in each beaker. The cathodes consisted of steel coupons with an exposed surface area of 6.25 square inches. The current supplied by each anode was the amount that would maintain a minimum protective potential of −0.86 to −0.91 volt to calomel on the steel. After the first day of operation the amount of current required to keep the minimum potential was found to decrease, and the decrease was far greater using the compositions of this invention. Current measurements were taken every few days and the results are reported in Table I.

*Table I*

SERIES I

| Solution | Current | | Percent current reduction from blank |
|---|---|---|---|
|   | Days | Ma./ft.[2] |   |
| A | 1 | 16.1 |   |
| A | 2 | 11.8 |   |
| A | 4 | 11.9 |   |
| A | 7 | 11.4 |   |
| B | 1 | 10.8 | 32.9 |
| B | 2 | 6.8 | 42.4 |
| B | 4 | 7.0 | 41.2 |
| B | 7 | 6.5 | 43.0 |
| C | 1 | 10.3 | 36.0 |
| C | 2 | 3.3 | 72.0 |
| C | 4 | 0.66 | 95.0 |
| C | 7 | 2.2 | 80.7 |
| D | 1 | 10.4 | 35.4 |
| D | 2 | 5.5 | 53.3 |
| D | 4 | 2.2 | 81.5 |
| D | 7 | 3.5 | 69.2 |

SERIES II

| A | 1 | 16.2 |   |
| A | 3 | 10.7 |   |
| A | 5 | 9.0 |   |
| A | 6 | [1] 8.7 |   |
| A | 7 | 8.3 |   |
| E | 1 | 14.4 | 11.1 |
| E | 3 | 8.8 | 17.7 |
| E | 6 | 8.1 | 6.9 |
| E | 7 | 7.7 | 7.2 |

[1] Est.

SERIES III

| A | 1 | 16.4 |   |
| A | 2 | 13.4 |   |
| A | 3 | 11.9 |   |
| A | 6 | 11.2 |   |
| A | 7 | 10.2 |   |
| F | 1 | 10.8 | 34.2 |
| F | 2 | 5.6 | 58.1 |
| F | 5 | 2.3 | 80.1 |
| F | 6 | 2.2 | 80.1 |
| F | 7 | 1.7 | 83.4 |
| G | 1 | 15.8 | 3.2 |
| G | 2 | 8.5 | 36.6 |
| G | 3 | 4.95 | 58.5 |
| G | 6 | 2.65 | 76.2 |
| G | 7 | 2.43 | 76.1 |
| H | 1 | 9.5 | 41.5 |
| H | 2 | 6.4 | 52.3 |
| H | 3 | 4.52 | 62.0 |
| H | 6 | 3.7 | 67.0 |
| H | 7 | 3.95 | 61.2 |
| J | 1 | 20.9 | −27.4 |
| J | 2 | 16.2 | −20.9 |
| J | 5 | 10.9 | 6.0 |
| J | 6 | 10.8 | 3.6 |
| J | 7 | 8.7 | 14.2 |
| K | 1 | 16.3 | 0 |
| K | 4 | 2.2 | 81.0 |
| K | 5 | 1.32 | 89.0 |
| K | 6 | 1.32 | 88.1 |
| K | 7 | 1.10 | 89.0 |
| L | 1 | 12.0 | 26.8 |
| L | 4 | 3.95 | 66.0 |
| L | 5 | 3.20 | 72.5 |
| L | 6 | 2.20 | 80.1 |
| L | 7 | 1.54 | 85.0 |
| M | 1 | 13.8 | 15.8 |
| M | 4 | 2.70 | 76.7 |
| M | 5 | 3.20 | 72.5 |
| M | 6 | 2.43 | 78.5 |
| M | 7 | 1.98 | 80.6 |

The results of these tests show the combination of arsenic and zinc ions in a solution to be effective in reducing current demand when added to the electrolyte of a cathodic protection system. A comparison of sample B with sample C shows that much less of a mixture of zinc and arsenic in the electrolyte gives protection at the start comparable to larger amounts of zinc, and much greater protection as the system ages. Likewise the use of arsenic compounds without a supply of zinc cations (sample E) results in only a fraction of the current savings obtainable where a zinc salt is also used (sample D) or a zinc anode is used (sample L) with about the same arsenic addition to the corrosive medium. The use of a zinc anode without any addition to the seawater (sample A, series III) does not give a current saving. The results show that arsenic and zinc ion additions to a corrosive aqueous medium saves current in a cathodic protection system although in some instances the solution may need to age before the savings are realized. It is also likely in these cathodic systems that the arsenic and/or zinc ions may spread the available current more evenly on the surface of the ferrous object, so that surfaces remote from the anode will receive a better share of the available current and thus will be more completely protected. The use of these additives also will frequently allow cathodic protection to be effective while using less anodes for a given ferrous surface.

In series IV, 4-ounce square bottles were filled with 100 ml. each of samples A and N to R and a steel coupon having a surface area of 0.23 square decimeter was immersed in each sample for a period of seven days. The coupons were removed from the liquid, examined for rust, and weighed. Table II reports loss of weight of the steel immersed in each sample in milligrams/square decimeter/day. Samples A and R were run in duplicate.

*Table II*

| Sample | Corrosion (MDD) | Percent corrosion reduction |
|--------|-----------------|-----------------------------|
| A      | 16.9            |                             |
| N      | 18.1            | −6.6                        |
| P      | 15.3            | 9.5                         |
| Q      | 15.9            | 5.9                         |
| R      | 1.6             | 90.5                        |

These results show that a seawater composition containing small extra amounts of water-soluble zinc and arsenic is an excellent corrosion resistant ballast composition, requiring less than half as much zinc and arsenic together as would be required for either material alone to give some protection from corrosion. Also, these results show that sharply increasing effectiveness of seawater solutions containing more than 300 or 400 p.p.m. combined zinc and arsenic in about equal proportions.

We claim:

1. A composition suitable for ballast in ships comprising water containing inorganic salts in the approximate proportions found in ocean water and in which a soluble zinc salt and an arsenic containing compound have been dissolved sufficient to provide at least about 150 p.p.m. zinc and at least about 150 p.p.m. arsenic in the water.

2. A method of retarding corrosion of a ferrous metal object in contact with a corrosive liquid aqueous medium containing dissolved inorganic salts which comprises dissolving in the medium at least about 150 p.p.m. of zinc ions and at least about 150 p.p.m. of water-soluble arsenic.

3. A method of retarding corrosion of a ferrous metal object in contact with a corrosive aqueous liquid medium containing dissolved inorganic salts which comprises dissolving in the medium a water-soluble zinc salt and water-soluble arsenic compound in an amount sufficient to provide at least about 10 p.p.m. dissolved zinc and at least about 2 p.p.m. dissolved arsenic, electrically connecting said ferrous metal object to an anode, providing a direct electric current and applying a charge to the medium sufficient to maintain a voltage on the ferrous object of at least about −0.8 volt to a calomel electrode.

4. The compositon of claim 1 where the zinc ions are provided by a salt selected from the group consisting of zinc chloride and zinc sulfate.

5. The composition of claim 4 where the arsenic is provided by arsenic acid.

6. A composition suitable for ballast in ships having a cathodic protection system comprising water containing inorganic salts in the approximate proportions found in ocean water and having dissolved therein at least about 10 p.p.m. zinc and an arsenic compound sufficient to provide at least about 2 p.p.m. arsenic.

7. The composition of claim 1 containing at least about 500 p.p.m. zinc compound and at least about 500 p.p.m. arsenic compound.

8. A composition suitable for ballast in ships having a zinc anode cathodic protection system comprising water containing inorganic salts in the approximate proportions found in ocean water and containing water-soluble arsenic compound in an amount sufficient to provide about 5–20 p.p.m. of dissolved arsenic.

9. The method of claim 2 in which arsenic acid and a zinc salt selected from the group consisting of zinc chloride and zinc sulfate are added to the medium to provide the dissolved zinc and arsenic.

10. The method of claim 3 in which the zinc ions are supplied by a zinc anode.

11. The method of claim 10 in which about 5–20 p.p.m. of arsenic is dissolved.

12. The method of retarding corrosion of a ballast tank in contact with water containing inorganic salts in the approximate proportions found in ocean water which comprises incorporating an arsenic compound sufficient to provide at least about 5–20 p.p.m. of dissolved water-soluble arsenic in the water, positioning in said water a zinc anode sufficient to maintain a voltage to the ballast tank of at least about −0.8 volt to a calomel electrode and electrically connecting said anode to said tank.

13. A method of retarding the corrosion of a ballast tank which comprises incorporating in sea water ballast a zinc salt and an arsenic compound in a ratio of about 1–5 parts zinc salt/part arsenic compound and in a total dissolved quantity sufficient to supply at least about seven parts per million parts of the ballast and applying to the composition an electric charge sufficient to maintain a voltage on the ballast tank of at least about −0.8 volt to a calomel electrode.

14. The composition of claim 1 containing about equal weights of dissolved zinc salt and dissolved arsenic compound.

15. The composition of claim 6 containing about 1 to to 5 parts zinc per part of arsenic.

16. The method of claim 2 in which about equal weights of soluble zinc salt and soluble arsenic compound are dissolved.

17. The method of claim 3 in which about 1 to 5 parts zinc are dissolved per part of arsenic.

References Cited by the Examiner

UNITED STATES PATENTS

| | | | |
|---|---|---|---|
| 1,877,504 | 9/1932 | Grebe et al. | 21—2.7 |
| 2,126,430 | 8/1938 | Unger | 21—2.7 |
| 2,319,667 | 5/1943 | Edmunds | 21—2.7 |
| 2,444,174 | 6/1948 | Tarr et al. | 204—148 |
| 2,839,462 | 6/1958 | Nelson | 204—148 |
| 2,996,445 | 8/1961 | Eisenberg et al. | 204—196 |
| 3,010,886 | 11/1961 | Chappell | 204—196 |

FOREIGN PATENTS 196,585  1/1924  Great Britain.

OTHER REFERENCES

Ephraim: "Inorganic Chemistry," 4th ed., 1943, page 733.

Mellor: Comprehensive Treatise on Inorganic and Theoretical Chemistry, vol. 9, 1929, pp. 180–182.

Watts: "Bulletin of the U. of Wisconsin," No. 83 (1938), pages 12–14.

JOHN H. MACK, *Primary Examiner.*

JOHN R. SPECK, MURRAY TILLMAN, WINSTON A. DOUGLAS, *Examiners.*